(12) United States Patent
Reggiani

(10) Patent No.: US 6,443,689 B1
(45) Date of Patent: Sep. 3, 2002

(54) APPARATUS FOR FORMING STACKS OF DISCOIDAL ARTICLES OF PREDETERMINED NUMBER, IN PARTICULAR OF METAL LIDS FOR CANS AND THE LIKE

(75) Inventor: Giuseppe Reggiani, Ilario d'Enza (IT)

(73) Assignee: Clevertech S.R.L., Reggio Emilia (IT)

(*) Notice: Subject to any disclaimer, the term of this patent is extended or adjusted under 35 U.S.C. 154(b) by 0 days.

(21) Appl. No.: 09/559,968

(22) Filed: Apr. 28, 2000

(30) Foreign Application Priority Data

Apr. 29, 1999 (IT) .......................... RE99A0052

(51) Int. Cl.[7] ............................................. B65B 35/50
(52) U.S. Cl. ................... 414/795.6; 53/532; 221/222; 414/797.7; 414/788.4
(58) Field of Search .................... 53/532; 198/431; 221/222; 414/795.6, 797.7, 788.4

(56) References Cited

U.S. PATENT DOCUMENTS

| 3,988,875 A | * 11/1976 | Fay ........................... 53/532 X |
| 4,955,794 A | * 9/1990 | Fluck ...................... 414/790.4 |
| 5,163,073 A | * 11/1992 | Chasteen et al. .... 414/795.6 X |
| 5,476,362 A | * 12/1995 | Kobak et al. ............ 414/797.7 |
| 5,494,399 A | * 2/1996 | Pearce .................. 414/797.7 X |
| 5,931,341 A | * 8/1999 | Bittermann .......... 414/797.7 X |

FOREIGN PATENT DOCUMENTS

| DE | 19 23 176 A | 11/1970 |
| DE | 39 19 380 A | 5/1990 |
| FR | 1 381 294 A | 12/1964 |
| GB | 528 265 A | 10/1940 |
| IT | 01260119 | 3/1996 |

* cited by examiner

Primary Examiner—Janice L. Krizek
(74) Attorney, Agent, or Firm—Birch, Stewart, Kolasch & Birch, LLP

(57) ABSTRACT

The apparatus comprises a screw device (10) arranged to deliver the articles one at a time, in a manner spaced from the others, after withdrawing them from a vertical pile resting on it, means for counting the articles delivered by the screw device (10) and, downstream thereof, a continuous track (20) along which the articles slide in a stacked arrangement and which leads the stacks containing a predetermined number of articles to a final station (50) in which the stacks are positioned horizontally or inclined; finally a rotary device (30) accompanies the stacks of articles of predetermined number and urges them one at a time along said track (20) from the point in which they leave the screw device (10) to the final station (50).

8 Claims, 5 Drawing Sheets

APPARATUS FOR FORMING STACKS OF DISCOIDAL ARTICLES OF PREDETERMINED NUMBER, IN PARTICULAR OF METAL LIDS FOR CANS AND THE LIKE

This invention relates to an apparatus for forming stacks of discoidal articles of predetermined number, in particular of metal lids for cans and the like to be seam-joined to the can body, and articles with equivalent geometrical characteristics.

A typical but non-exclusive application of the invention is in plants for preparing packs of stacked can lids. These packs are prepared by the lid manufacturer and then shipped to the factory which applies the lid after feeding the product into the can.

An object of this invention is to provide an apparatus able to form stacks of discoidal objects of predetermined number, which operates with precision and reliability.

This and further objects are attained by the invention as characterised in the claims.

The invention is based on the fact of comprising a screw device arranged to deliver the articles one at a time, in a manner spaced from the others, after withdrawing them from a vertical pile resting on it, and means for counting the articles delivered by the screw device; it also comprises a continuous track along which the articles slide in a stacked arrangement and which commences downstream of the screw device to lead the stacks containing a predetermined number of articles to a final station in which the stacks are positioned horizontally or inclined; finally a rotary device is provided to accompany the stacks of articles of predetermined number and urge them one at a time along said track from the point in which they leave the screw device to the final station.

The invention is described in detail hereinafter with the aid of the accompanying figures, which illustrate a non-exclusive embodiment thereof by way of example.

The apparatus of the invention comprises, in its initial part, a screw device 10 arranged to deliver the articles 8 (in particular substantially flat metal lids for cans), one at a time, in a manner spaced from the others, by withdrawing them from a vertical pile 81 of indeterminate length resting on it.

Figure 3:
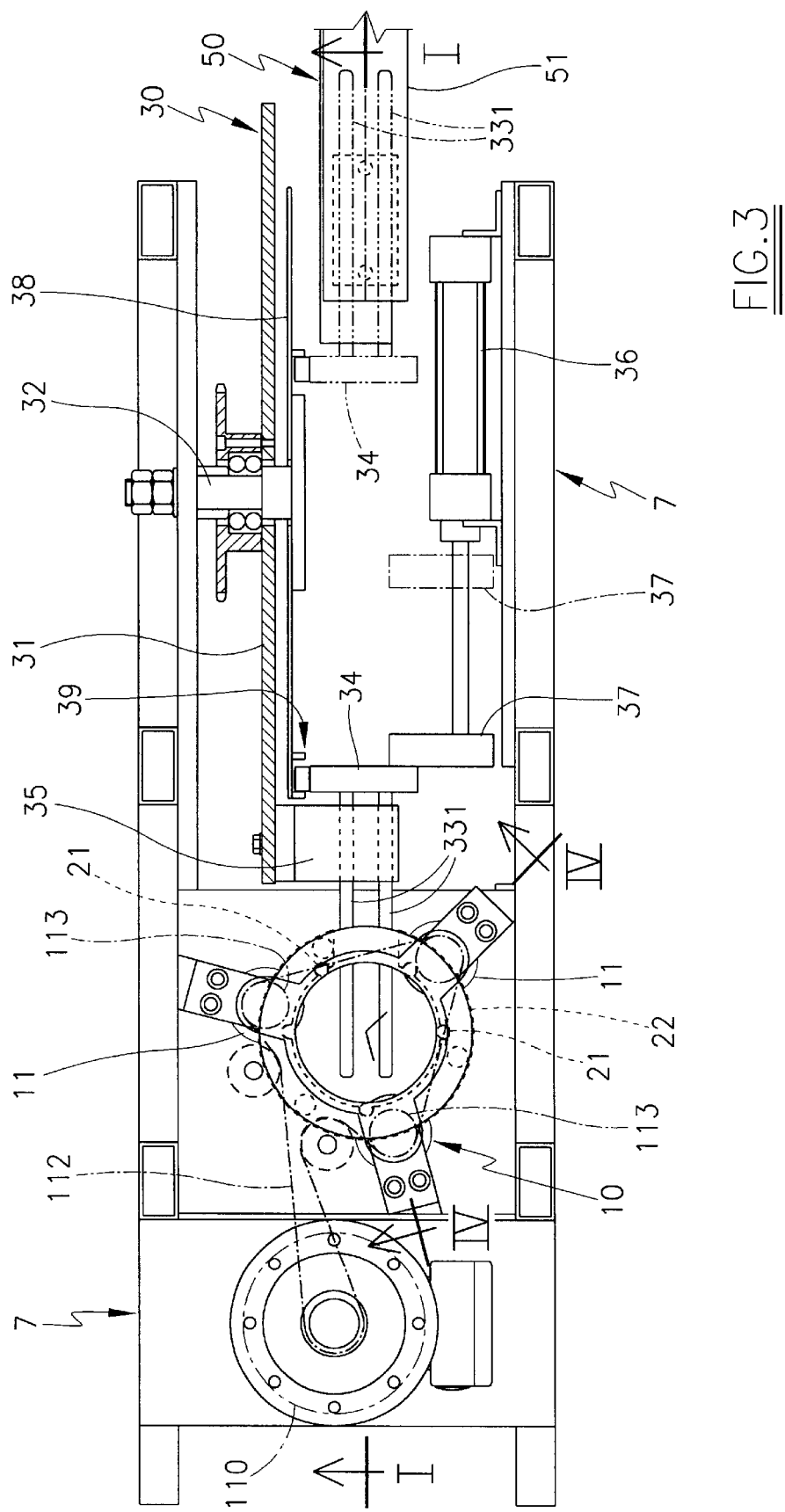
FIG. 3 is a section on the plane III—III of FIG. 2.
Figure 4A:
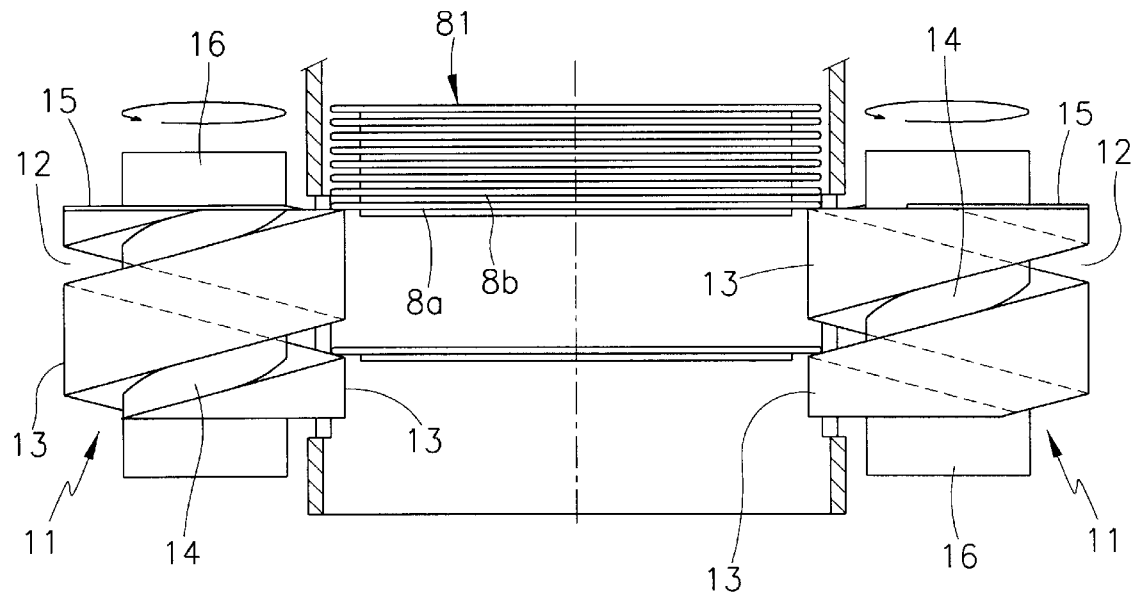
FIGS. 4A, 4B and 4C are schematic sections through the screw device on the plane IV—IV of FIG. 3, taken at three successive moments of its operation.
Figure 4B:
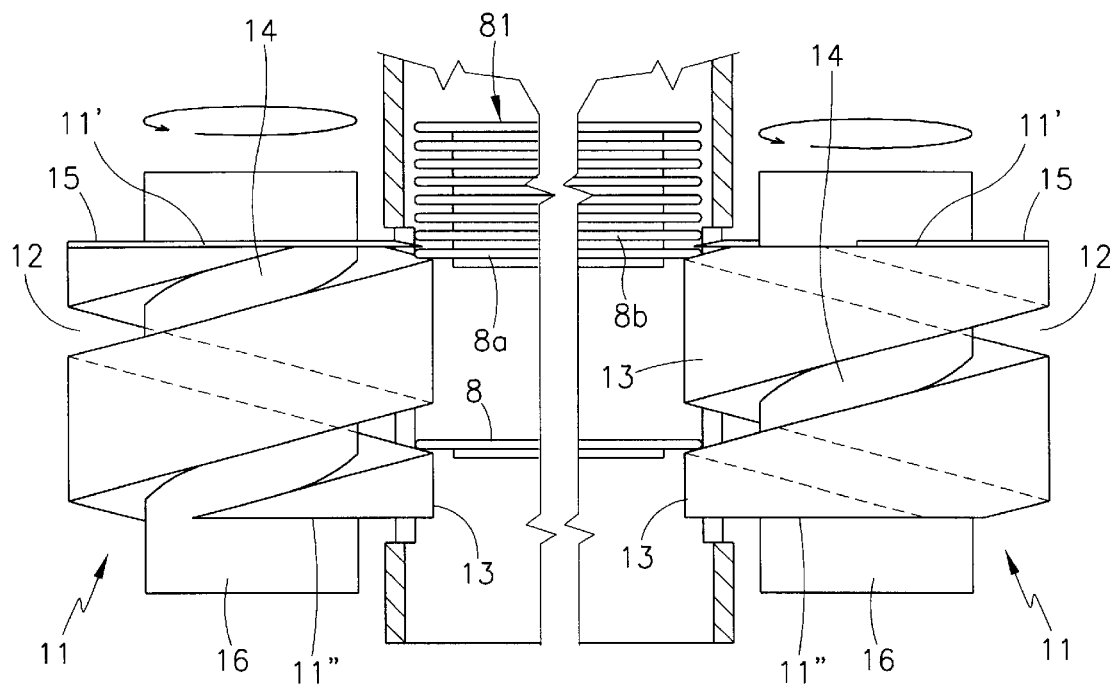
Figure 4C:
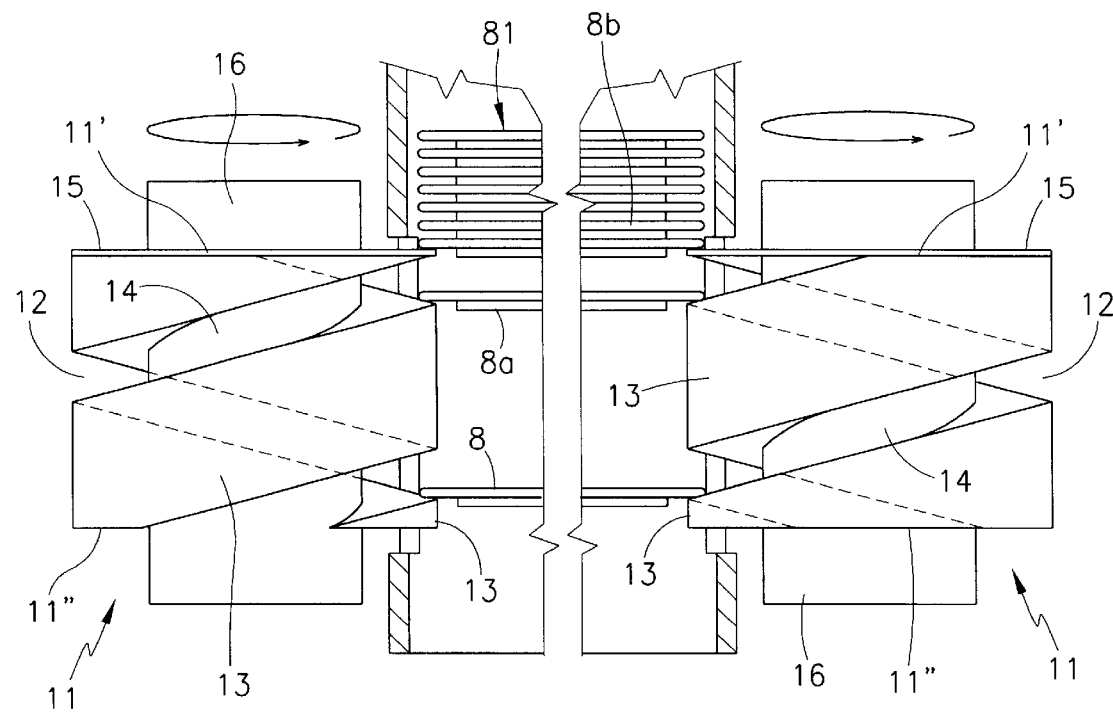

FIGS. 4A 4B and 4C show the screw device 10 in detail in a simplified manner. The screw device 10 comprises two or more parallel worms 11 (in this case three are provided) of vertical axis, rotated with the same speed and direction by a motor 110 via a transmission chain 112 and respective sprockets 113 (shown only in FIG. 3). Each worm 11 comprises a cylindrical body, with a shaft 16, in the lateral surface of which there is provided a helical groove 12 of square cross-section, opening into the upper end 11' and lower end 11" of the worm 11. The remaining part of the body defines a helical thread 13 projecting radially from the base 14 of the groove.

Figure 5:
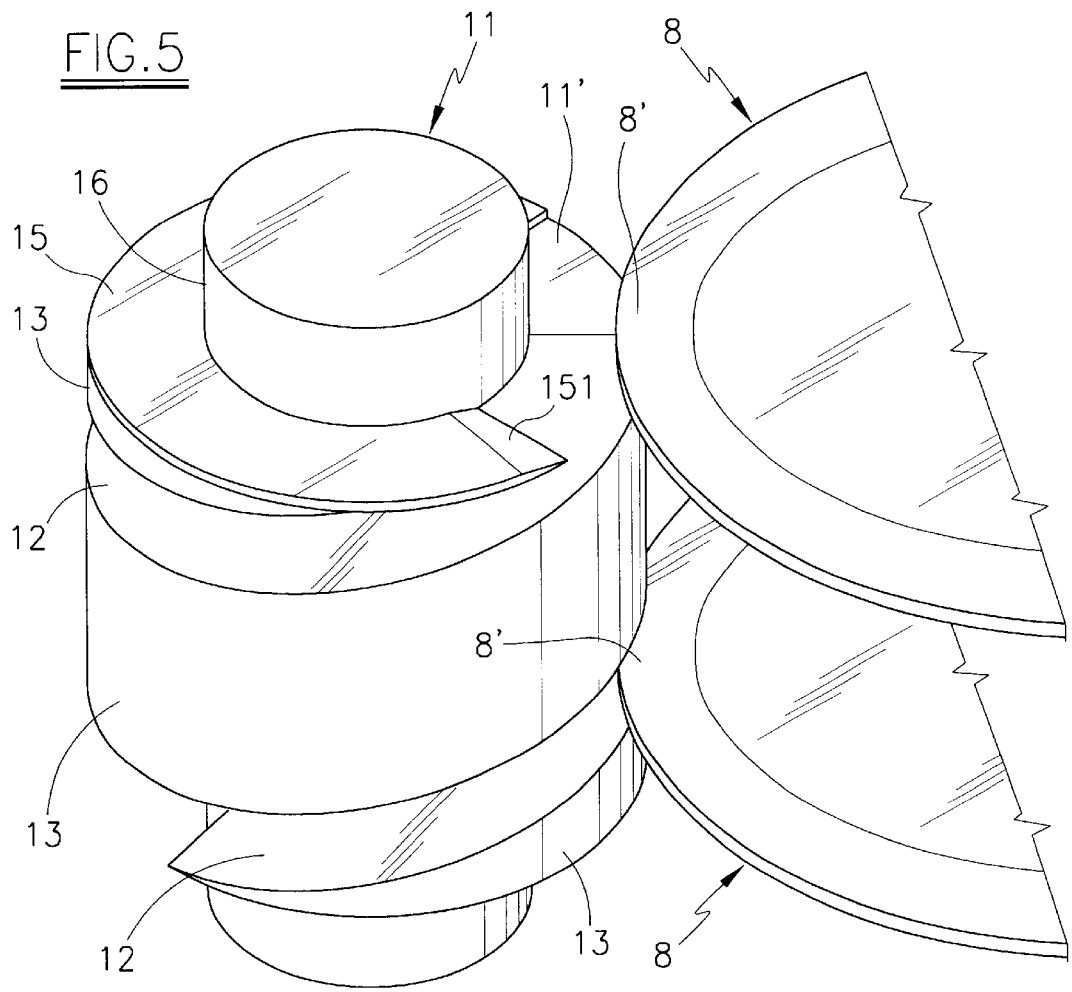
FIG. 5 is a perspective view of one of the screw means of FIG. 4A.

The worms 11 are distributed angularly and positioned at the same distance from the axis of the pile 81, in geometrical relationship with the articles 8 such that these rest simultaneously, via their peripheral edge 8' (see FIG. 5), on the upper end 11' and then on the thread 13. Above the upper end 11' of each worm there is provided a flat thin element 15 having a sharp radial edge 151 and projecting radially from the shaft 16 in the manner of the thread 13, and also projecting above the point in which the groove 12 opens into the upper end 11'. The element 15 separates two adjacent articles by means of its edge 151, its angular position relative to the groove 12 being adjustable on the basis of the thickness of the articles 8. In detail, the article 8 positioned at the bottom of the pile 81 (indicated by 8a in FIGS. 4A, 4B, 4C) firstly rests, via its edge, on the upper end 11' of the worms 11 (see FIG. 4A), then as these rotate, the edge of the article 8a gradually passes to rest on the upper surface of the groove 12. At the moment in which this passage occurs, the edge 151 of the element 15 becomes inserted between the article 8a and that article 8b immediately above it. As the worms 11 continue to rotate, the article 8b (and hence the entire overlying pile) is supported by the element 15 and is held at rest, whereas the edge of the article 8a slides along the groove 12, to move downwards until it leaves the device 10 and falls freely downwards.

In this manner, the device 10 separates and spaces (by a distance equal to the pitch of the groove 12) the individual articles from the vertical pile 81 resting on the upper edge of the worms 11, and makes them descend one at a time in succession.

Above the device 10 there are positioned a number of angularly distributed vertical rods 61 arranged in mutual geometrical relationship to define a vertical corridor to contain the pile 81 of articles with a certain degree of play.

Immediately downstream of the device 10 there are provided means to count the articles delivered by the device. Specifically, two optical sensor means 17 (in particular of fibre optic type) are provided to sense the passage of the articles 8 as these fall from the device 10, and to feed the relative signal to an electronic device (of known type, not shown in the figures) which counts them.

Immediately downstream of the device 10 there commences a continuous track 20 along which the articles arranged in stacks slide, its upstream end commencing vertically to then, after an angle of at least 90 degrees, lead the stacks of articles to a final station 50 in which the stacks lie horizontally or inclined (as in the figures).

In detail, the track 20 comprises a number of angularly distributed, mutually parallel rods 21 arranged in a geometrical relationship such as to define a corridor to contain a stack of articles 8 with a certain degree of play. The rods 21 are curved to form a substantially circumference-shaped path preferably passing through an angle of 100–150 degrees.

The rods 21 are connected together and supported by rings 22, each of which is fixed to all the rods 21. The rings are open in that region facing the interior of the arc so that between the two rods 21 positioned in this region a longitudinal channel remains open for passage of the radial elements 33a and 33b (described in detail hereinafter).

To the side of the track 20 and coplanar with it there is provided a rotary device 30 arranged to accompany the stacks of articles 8 and urge the stacks, one at a time, along the track 20 from the point in which they leave the screw device to the final station 50.

The rotary device 30 comprises a wheel 31 of horizontal axis positioned to the side of but close to the middle vertical plane through the track 20, which extends substantially as an arc of a circle with its centre substantially coaxial to the wheel 31. This latter is carried by a shaft 32 supported by the general support frame 7 of the apparatus, and is rotated by a motor 310 via a chain transmission 311.

The wheel 31 rotates a plurality of pairs of radial elements 33a and 33b, each comprising two parallel radial rods 331 joined together at their inner end by a rear piece 34. Each radial element 33a, 33b is secured to the wheel 31 by a respective guide piece 35 which is fixed to the wheel 31 and has two radial through holes through which the rods 331 slide as an exact fit. By virtue of this connection, the elements 33a and 33b can be moved radially to the wheel 31, between an extracted position in which they are relatively far from the centre of the wheel 31 to interfere with the path of the cylinder-piston units 8 positioned on the continuous track, and a retracted position in which they are relatively close to the centre of the wheel and do not interfere with the articles 8. The guide pieces 35 are fixed to the front face of the wheel 31 and project axially forwards from it such that the middle vertical plane in which the elements 33a, 33b move is substantially coplanar with the middle vertical plane through the length of the track 20.

Means for radially displacing the elements 33a, 33b are also provided, to move the radial elements 33a, 33b into and maintain them in their extracted position and their retracted position successively, in combination with the rotation of the wheel 31.

These means comprise a pneumatic cylinder-piston unit 36 supported by the frame 7 in a fixed position to the side of the central region of the wheel 31, such as not to interfere with the path of the elements 33a, 33b rotated by the wheel 31. The horizontal projection of the axis of the cylinder-piston unit 36 passes substantially through the centre of the wheel 31. The rod of the cylinder-piston unit 36 carries at its end a body 37 projecting sideways towards the wheel 31 and into the path defined by the rear pieces 34. When the rod of the cylinder-piston unit 36 is in a retracted position, the body 37 is close to the axis of the wheel 31 (as shown by dashed and dotted lines in FIG. 3) and does not interfere with the path of the elements 33a, 33b, whereas when the rod is extended, the body 37 intercepts that piece 34 lying in the same trajectory to urge the relative radial element 33a, 33b into its extracted position (as shown by full lines in FIG. 3).

To the side of and close to the wheel 31 there is positioned a fixed vertical disc 38 fixed to the frame 7 in a position to the inside of the path of the guide pieces 35 so as not to interfere with them. On the front face of the disc 38 there is provided a track 39 formed from two forward-projecting concentric walls 39' and 39", between which the rear pieces 34 slide in a guided manner.

The radial elements are divided into a number of pairs (three in the embodiment shown in the figures), each comprising an upstream element 33a and a downstream element 33b.

The elements 33a, 33b of each pair form between them an angle slightly greater than the angle of the circumferential arc defined by a stack of articles 8 of predetermined number lying on the track 20.

The cylinder-piston unit 36 operates to move the radial elements 33a, 33b into their extracted position when these reach a predetermined angular position in which they lie a short distance from the exit of the screw device. In a preferred embodiment, shown in the figures, the cylinder-piston unit 36 has its axis in a horizontal plane P (in which the axis of the wheel 31 also lies) positioned a short distance below the exit of the device 10, to extract the radial elements 33a, 33b when these lie in the plane P.

The track 39 commences in the plane P, at the point in which the rear piece 34 lies when the element 33a, 33b is in its extracted position, and continues in the direction of advancement of the articles, to remain at a constant distance from the axis of the wheel 31 and hence maintain the elements 33a, 33b in their extracted position. When the elements 33a, 33b have passed beyond the commencement of the final station 50, the track 39 gradually reduces its distance from the wheel 31, to return the elements 33a, 33b to their retracted position.

The apparatus also comprises an automatic control system, of known type not shown in the figures, connected to the article counting means.

The articles 8 to be handled by the apparatus of the invention are positioned initially in the vertical corridor defined by the rods 61, to form a pile 81 of indefinite length.

The apparatus of the invention operates in the form of operating cycles, each comprising a first stage in which the cylinder-piston units 8 leaving the device 10 are counted while they descend, and are stacked within the descending portion of the track 20 by resting against a front radial element 33a. When the stack attains the predetermined number of articles (stack complete), the second stage is implemented in which the complete stack is moved forwards through a small angle and a rear radial element 33b is placed against the upstream end of the complete stack.

During the first stage of the next cycle, while a stack resting against the next front radial element 33a is being formed, said complete pile is urged by the relative rear radial element 33b along the ascending portion of the track 20, as far as the final station 50.

In detail, at the commencement of the operating cycle, a front radial element 33a lies in the horizontal plane P and is urged into its extracted position by the cylinder-piston unit 36, such that its most outer portion intersects the track 20 at a point just below the exit of the articles 8 from the device 10 (as shown by dashed and dotted lines in FIG. 2).

At this point the articles 8 gradually leave the device 10, to fall into the track 20 and halt when resting on the element 33a. They are simultaneously sensed by the sensors 17 and counted.

Figure 2:
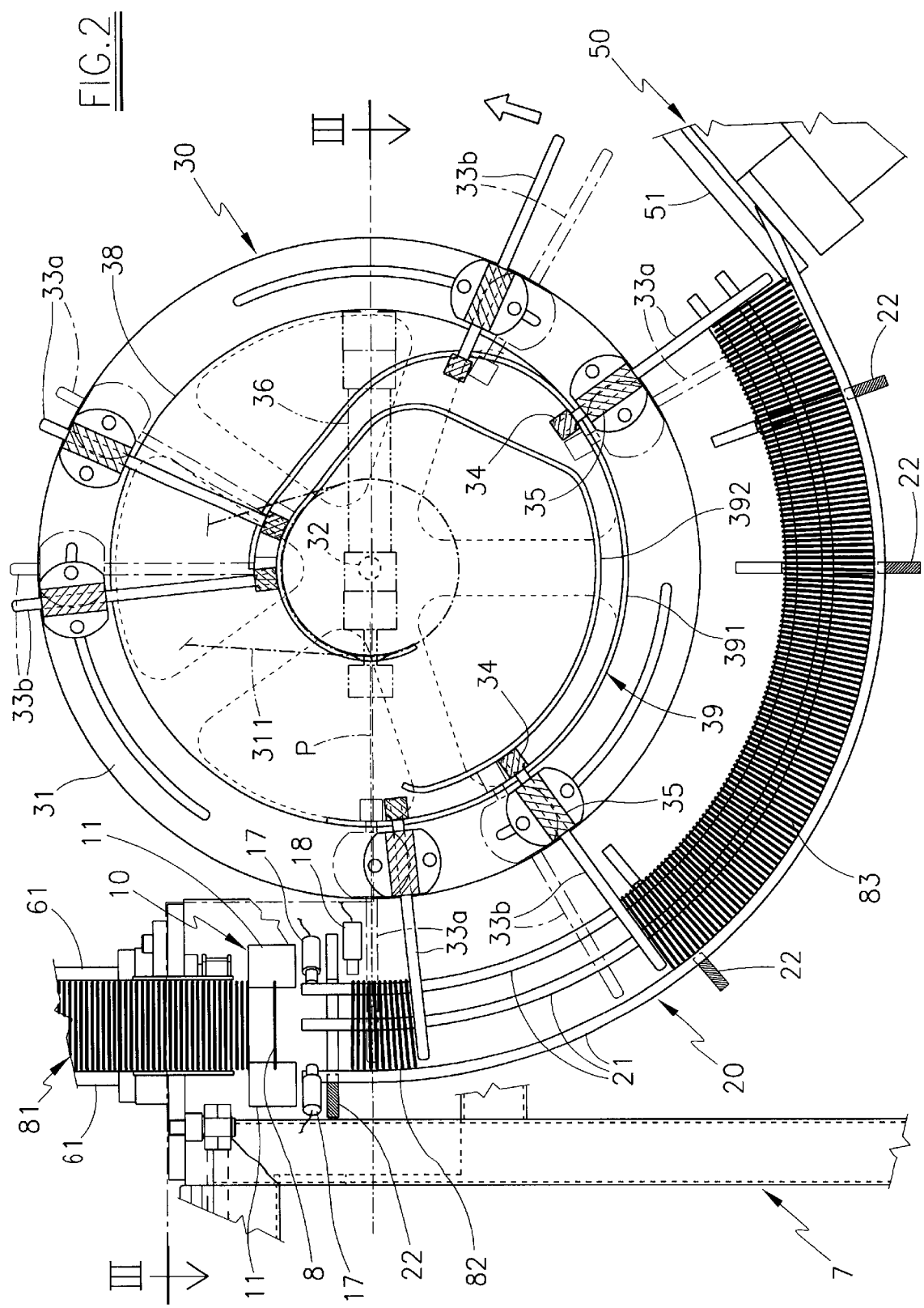
FIG. 2 is an enlarged portion of FIG. 1.

As the articles 8 enter the track 20, they gradually accumulate to form a small stack 82, the device 30 being rotated in the same direction so that the top of the stack under formation is always a short distance from the exit of the device 10 (as shown by full lines in FIG. 2). In this respect, a sensor 18 is provided to inform the automatic control system when the top of the stack 82 has reached a predetermined distance from the exit of the device 10. As soon as this happens, the system-produces a (relatively small) angular movement of the wheel 31 to lower the top of the stack.

The wheel 31 then advances in small angular steps (in an anticlockwise direction), until the stack 82 has attained the predetermined number of articles 8. During this stage, the stack 82 is supported by the track 20 and by the single radial element 33a, which is maintained in its extracted position, guided by the track 39. It is therefore necessary for the stack 82 to occupy not more than the descending portion of the track 20, or that plus only a small part of the rising portion, to enable the articles 8 to accumulate compactly by gravity, one on another. When the stack 82 attains the predetermined number of articles, the front element 33a has therefore preferably not exceeded or only slightly exceeded the minimum point of the track 20.

Figure 1:
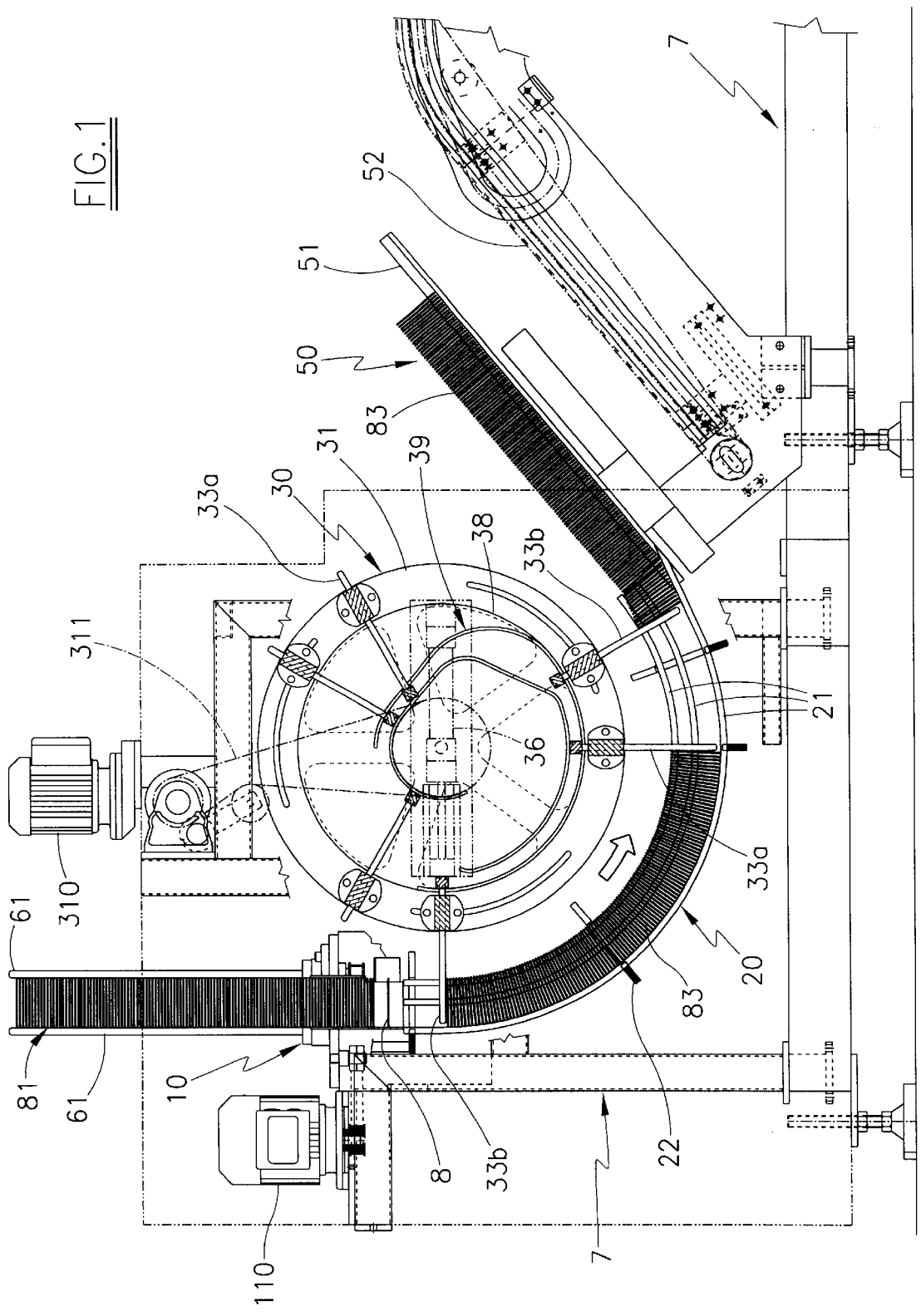
FIG. 1 is a section on the vertical plane I—I of FIG. 3.

At this point, the system commences the short second stage of the cycle, in which while the operation of the device 10 is halted, the wheel 31 is firstly rotated through a small angle such as to bring the rear element 33b into the plane P. Immediately afterwards, the cylinder-piston unit 36 is operated to move the element 33b into its extracted position (as shown in FIG. 1) in which, because of its angular distance from the element 33a, it lies slightly above the top of the stack 82. At this point, the stack of articles, which is now composed of the predetermined number of articles 8 (stack complete, now indicated by 83), is enclosed by the pair of elements 33a and 33b. As soon as the element 33b has been urged into its extracted position, the system rotates the wheel 31 to move the front element 33a of the next pair of elements 33a, 33b into the plane P, the device 10 then again operating to recommence the aforedescribed cycle.

After the rear element 33b has also been urged into its extracted position, the complete stack 83 is enclosed at its two ends by a pair of elements 33a and 33b and can hence rise along the ascending portion of the track 20, while remaining compact. This happens while the articles 8 continue to gradually descend from the device 10 and the wheel 31 advances in small steps to produce a forming pile 82 resting on the following front element 33a.

As the wheel 31 advances in the described manner, the complete stack 83 is urged up the ascending portion of the track 20 by the rear element 33b until it enters the station 50, to rest on an upwardly inclined straight chute 51. The track 20 terminates after the commencement of the station 50, and the stack 83 lying on the chute 51 can be gripped by known means which transfer it to the next operating station.

In particular, the stack 83 can be conveniently manipulated by a transfer device such as that described in Italian patent No. 1260119 of the present applicant, comprising two longitudinal elements (not shown in the figures) acting as a clamp to grip the stack 83 lying on the chute 51 along its lateral sides, and moving along a fixed guide 52, the initial portion of which lies below the chute 51.

After the rear element 33b has pushed the stack 83 onto the chute 51, the track 39 gradually returns it to its retracted position.

During the subsequent rotation of the wheel 31, the elements 33a and 33b remain in their extracted state, partly compelled by the track 39 and partly by their own weight, until they reach the position defined by the plane P.

This invention enables stacks to be obtained composed of any precise number of articles, and presented on a station in a position comfortable for manipulation by a subsequent machine.

Numerous modifications of a practical and applicational type can be made to the invention, but without leaving the scope of the inventive idea, as claimed hereinafter.

I claim:

1. An apparatus for forming stacks of discoidal articles (8) of predetermined number, in particular of metal lids for cans, comprising:
    a screw device (10) arranged to deliver the articles one at a time, in a manner spaced from the others, after withdrawing them from a vertical pile (81) resting on it;
    means for counting the articles delivered by the screw device (10);
    a continuous track (20) along which the articles slide in a stacked arrangement and which commences downstream of the screw device (10) to lead the stacks containing a predetermined number of articles to a final station (50) in which the stacks are positioned horizontally or inclined;
    a rotary device (30) which accompanies the stacks of articles of predetermined number and urges them one at a time along said track (20) from the point at which they leave the screw device (10) to the final station (50).

2. An apparatus as claimed in claim 1, characterised in that the screw device comprises two or more identically rotated worms (11) of vertical axis, on the thread of which there rests the peripheral edge of the articles and which are arranged to individually separate the articles from the vertical pile (81) which rests on the worms (11), and to cause them to descend by rotating the worms (11).

3. An apparatus as claimed in claim 1, characterised in that said continuous track (20) on which the stacked articles slide commences vertically from its upstream end through a descending portion to then, after passing through an angle of at least 90 degrees, lead the stack of articles through an ascending portion to a final station (50) in which the stacks are positioned horizontally or inclined.

4. An apparatus as claimed in claim 1, characterised in that the rotary device (30) comprises:
    a wheel (31) of horizontal axis positioned to the side of the continuous track (20), the continuous track (20) having a path substantially in the form of a circumferential arc with its centre substantially coaxial with the wheel (31);
    a plurality of pairs of radial elements (33a, 33b) which are rotated by the wheel (31) and can be moved radially to the wheel (31) between an extracted position in which they interfere with the path of the articles on the continuous track (20), and a retracted position in which they do not interfere with said articles;
    means (36, 39) for radially displacing the radial elements (33a, 33b), to move the radial elements into and then maintain them in an extracted position and in a retracted position successively, in combination with the rotation of the wheel (31).

5. An apparatus as claimed in claim 4, characterised in that the radial elements (33a, 33b) of each pair form between them an angle slightly greater than the angle of the circumferential arc defined by a stack of articles of predetermined number lying on the track (20), said means (36, 39) for radially displacing the radial elements (33a, 33b) operating by moving these latter into their extracted position when they lie in a predetermined angular position at a short distance from the exit of the screw device (10), and returning them to their retracted position when the radial elements (33a, 33b) have passed beyond the commencement of the final station (50).

6. An apparatus as claimed in claim 3, comprising a control system, connected to the article counting means in order to determine cyclic operation, each cycle comprising:
    a first stage in which the articles (8) leaving the screw device (10) are counted while they descend, and are stacked within the descending portion of the track (20) by resting against a front radial element (33a) until the stack attains the predetermined number of articles (8);
    second stage in which the complete stack is moved forwards through a small angle and a rear radial element (33b) is placed against the upstream end of the complete stack;
    during the first stage of the next cycle, while a stack resting against the next front radial element (33a) is being formed, the previously formed complete stack is urged by the relative rear radial element (33b) along the ascending portion of the track (20), as far as the final station (50).

7. An apparatus as claimed in claim 6, characterised in that at the commencement of the operating cycle, a front radial element (33a) lies in a horizontal plane P and is urged into its extracted position by a cylinder-piston unit (36), such that its most outer portion intersects the track (20) at a point just below the exit of the screw device (10), after which as the articles (8) enter the track, (20), where they accumulate to form a stack (82), the device (30) is rotated in the same direction, to lower the front element (33*a*) such that the top of the stack (82) under formation is always a short distance from the exit of the screw device (10).

8. An apparatus as claimed in claim 7, characterised in that during the second stage of the cycle, while the operation of the screw device (10) is halted, the wheel (31) is firstly rotated through a small angle such as to bring the rear element (33*b*) into the plane P; immediately afterwards, the cylinder-piston unit (36) is operated to move the element (33*b*) into its extracted position in which it lies slightly above the top of the stack (82); the wheel (31) is then rotated to move the front element (33*a*) of the next pair of elements (33*a*, 33*b*) into the plane P.

* * * * *